United States Patent
Yoshida et al.

(10) Patent No.: US 10,099,303 B2
(45) Date of Patent: Oct. 16, 2018

(54) ELECTRIC POWER TOOL

(71) Applicant: HITACHI KOKI CO., LTD., Tokyo (JP)

(72) Inventors: Kenichirou Yoshida, Ibaraki (JP); Akira Onose, Ibaraki (JP); Shinji Kuragano, Ibaraki (JP)

(73) Assignee: HITACHI KOKI CO., LTD., Tokyo (JP)

( * ) Notice: Subject to any disclaimer, the term of this patent is extended or adjusted under 35 U.S.C. 154(b) by 49 days.

(21) Appl. No.: 14/912,838

(22) PCT Filed: Aug. 4, 2014

(86) PCT No.: PCT/JP2014/071132
§ 371 (c)(1),
(2) Date: Feb. 18, 2016

(87) PCT Pub. No.: WO2015/025750
PCT Pub. Date: Feb. 26, 2015

(65) Prior Publication Data
US 2016/0193673 A1    Jul. 7, 2016

(30) Foreign Application Priority Data
Aug. 19, 2013   (JP) ................. 2013-169596

(51) Int. Cl.
*B25F 5/00* (2006.01)
*B23D 47/12* (2006.01)
*B23D 59/00* (2006.01)

(52) U.S. Cl.
CPC .......... *B23D 59/001* (2013.01); *B23D 47/12* (2013.01); *B25F 5/00* (2013.01); *B25F 5/001* (2013.01)

(58) Field of Classification Search
CPC ......... B23D 47/12; B23D 59/001; B25F 5/00; B25F 5/001
See application file for complete search history.

(56) References Cited

U.S. PATENT DOCUMENTS

2007/0000676 A1* 1/2007 Arimura ................. B25B 21/02
                                                  173/179
2011/0284256 A1   11/2011 Iwata
(Continued)

FOREIGN PATENT DOCUMENTS

EP    2 485 390 A2    8/2012
EP    2 572 834 A1    3/2013
(Continued)

OTHER PUBLICATIONS

International Search Report and Written Opinion of the International Search Report for PCT/JP2014/071132 dated Nov. 19, 2014.
(Continued)

*Primary Examiner* — Stephen Choi
(74) *Attorney, Agent, or Firm* — Kenealy Vaidya LLP

(57) ABSTRACT

An electric power tool includes a brushless motor, a control unit configured to control power supply to the brushless motor, a rotary tool configured to be rotated by the brushless motor, a rotation speed detecting unit configured to detect a rotation speed of the brushless motor, a main switch configured to transmit, to the control unit, an ON/OFF signal for switching between driving and stopping of the brushless motor, and a mode switching unit configured to transmit, to the control unit, a mode switching signal for switching between multiple modes of rotation control of the brushless motor, the control unit is configured to perform the rotation control of the brushless motor in any one of the multiple modes including at least a high-speed mode and a low-speed mode.

14 Claims, 10 Drawing Sheets

(56) References Cited

U.S. PATENT DOCUMENTS

| | | |
|---|---|---|
| 2012/0191250 A1 | 7/2012 | Iwata et al. |
| 2012/0200244 A1 | 8/2012 | Otokawa et al. |
| 2013/0062086 A1* | 3/2013 | Ito .................... B25B 23/1475 173/1 |
| 2013/0076271 A1 | 3/2013 | Suda et al. |
| 2013/0082631 A1 | 4/2013 | Suzuki et al. |
| 2013/0314007 A1 | 11/2013 | Yanagihara et al. |

FOREIGN PATENT DOCUMENTS

| | | |
|---|---|---|
| JP | 3-14576 A | 1/1994 |
| JP | 2008-132545 A | 6/2008 |
| JP | 2011-16210 A | 1/2011 |
| JP | 2011-240441 A | 12/2011 |
| JP | 2012-726 A | 1/2012 |
| WO | 2012/108415 A1 | 8/2012 |

OTHER PUBLICATIONS

Japanese Office Action for the related Japanese Patent Application No. 2013-169596 dated Oct. 5, 2016.

\* cited by examiner

CROSS SECTION TAKEN ALONG LINE A-A

ELECTRIC POWER TOOL

TECHNICAL FIELD

The present invention relates to an electric power tool such as a circular saw.

BACKGROUND ART

In a circular saw, for example, in order to increase cutting efficiency, it is necessary to increase the rotation speed of a saw blade during cutting. To this end, it is necessary to increase the rotation speed during no-load. Even at the markets, in order to emphasize a smooth cutting performance, the manufactures tend to appeal the high-speed rotation during no-load.

If the rotation speed during no-load increases, there are problems that vibration and noise increase and power consumption unnecessarily increases. These problems are not limited to a circular saw, but are common to other electric power tools such as a grinder.

SUMMARY OF INVENTION

Technical Problem

The present invention has been made in view of the above-described circumstances, and an aspect of the present invention provides an electric power tool which can control a brushless motor at multiple rotation speeds and is excellent in work efficiency.

According to an illustrative embodiment of the present invention, there is provided an electric power tool comprising: a brushless motor; a control unit configured to control power supply to the brushless motor; a rotary tool configured to be rotated by the brushless motor; a rotation speed detecting unit configured to detect a rotation speed of the brushless motor; a main switch configured to transmit, to the control unit, an ON/OFF signal for switching between driving and stopping of the brushless motor; and a mode switching unit configured to transmit, to the control unit, a mode switching signal for switching between multiple modes of rotation control of the brushless motor, wherein the control unit is configured to perform the rotation control of the brushless motor in any one of the multiple modes including at least a high-speed mode and a low-speed mode.

In the above electric power tool, in the low-speed mode, the control unit may be configured to control the brushless motor to rotate at a predetermined first rotation speed in a predetermined load range, by duty ratio control.

In the above electric power tool, in the high-speed mode, the control unit may be configured to control the brushless motor to rotate at a predetermined second rotation speed higher than the predetermined first rotation speed in a predetermined load range, by duty ratio control.

The above electric power tool may further comprise a battery pack which is removably attached and is configured to supply electric power to the brushless motor and the control unit.

In the above electric power tool, in the low-speed mode, when a load equal to or larger than a first predetermined value is detected, the control unit may be configured to perform switching to predetermined duty ratio control which is independent from the rotation speed of the brushless motor.

In the above electric power tool, detection of the load equal to or larger than the first predetermined value may be performed based on predetermined one or combination of a current, a voltage, and a duty ratio.

In the above electric power tool, the predetermined duty ratio control may include control for gradually increasing a duty ratio to a predetermined duty ratio and then driving the brushless motor with the predetermined duty ratio.

In the above electric power tool, when a load equal to or smaller than a second predetermined value which is smaller than the first predetermined value for switching to the predetermined duty ratio control is detected in a state where the predetermined duty ratio control is performed, the control unit may be configured to gradually decrease the duty ratio and then control the brushless motor to rotate at a predetermined first rotation speed.

In the above electric power tool, the rotary tool may be a saw blade connected to an output shaft of the brushless motor through a deceleration mechanism, and in a predetermined load range, the control unit may be configured to control the brushless motor in the low-speed mode such that a rotation speed of the saw blade becomes constant in a range from 2,500 rpm to 3,500 rpm, and is configured to control the brushless motor in the high-speed mode such that the rotation speed of the saw blade becomes constant in a range from 4,500 rpm to 5,500 rpm.

In the above electric power tool, the control unit may be configured to perform soft start control for gradually supplying a current at starting of the brushless motor.

According to another illustrative embodiment of the present invention, there is provided an electric power tool comprising: a brushless motor; a control unit configured to control power supply to the brushless motor; a rotary tool configured to be rotated by the brushless motor; a rotation speed detecting unit configured to detect a rotation speed of the brushless motor; and a main switch configured to transmit, to the control unit, an ON/OFF signal for switching between driving and stopping of the brushless motor, wherein in a state where constant-speed control is performed on the brushless motor with a duty ratio smaller than 100%, when a load equal to or larger than a first predetermined value is detected, the control unit is configured to perform switching from the constant-speed control to predetermined duty ratio control which is dependent from the rotation speed of the brushless motor, and wherein the predetermined duty ratio control is control for gradually increasing the duty ratio to a predetermined duty ratio and then driving the brushless motor with the predetermined duty ratio.

In the above electric power tool, the load at which the constant-speed control is switched to the predetermined duty ratio control may be set to such a threshold value that if the load exceeds the threshold value, an efficiency of the predetermined duty ratio control becomes higher than an efficiency of the constant-speed control, or may be set to a value in the vicinity of the threshold value.

In the above electric power tool, when a load equal to or smaller than a second predetermined value is detected in a state where the predetermined duty ratio control is performed, the control unit may be configured to gradually decrease the duty ratio such that the rotation speed of the brushless motor becomes a predetermined rotation speed, and then perform the constant-speed control on the brushless motor at the predetermined rotation speed.

In the above electric power tool, the second predetermined value at which the duty ratio may be decreased from the predetermined duty ratio control to the constant-speed control is smaller than the first predetermined value at which the constant-speed control is changed to the predetermined duty ratio control.

Also, arbitrary combinations of the above described components, and modifications obtained by conversion of the embodiments of the present invention between methods and systems are valid as embodiments of the present invention.

According to the above configuration, it is possible to provide an electric power tool capable of controlling a brushless motor at multiple rotation speeds and excellent in work efficiency.

DESCRIPTION OF EMBODIMENT

Figure 1:
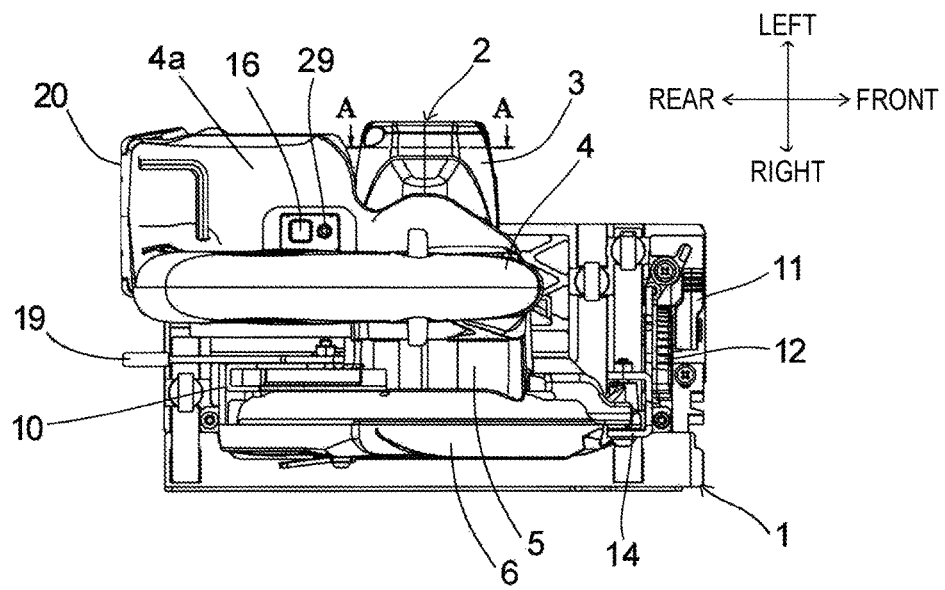
FIG. 1 is a plan view showing a cordless circular saw according to an embodiment of the present invention.
Figure 2:
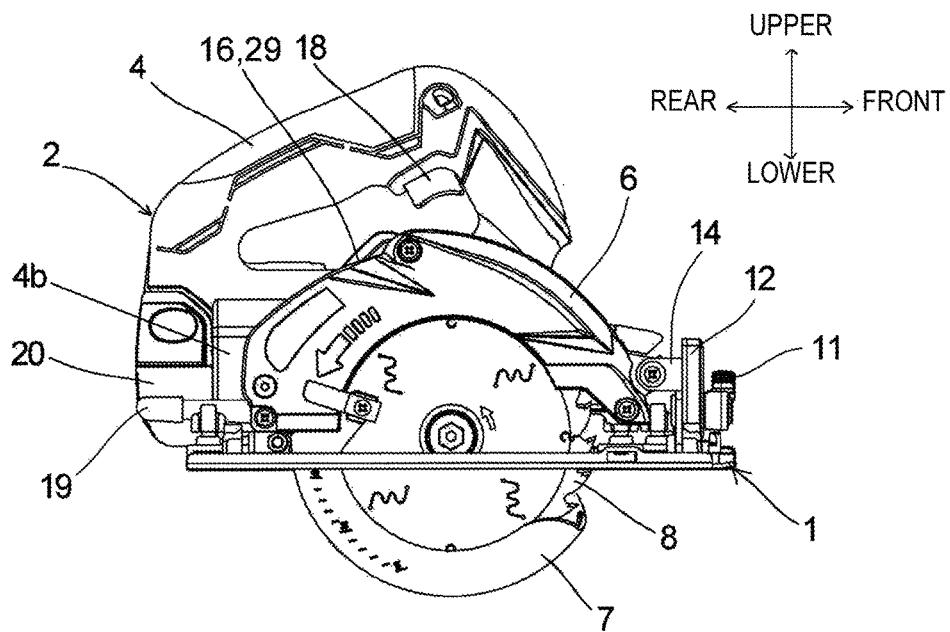
FIG. 2 is a side view of the cordless circular saw.

Hereinafter, embodiments of the present invention will be described with reference to the accompanying drawings. Components, members, and the like shown in the drawings and identical or equivalent to each other are denoted by the same reference symbol and may not be repeatedly described. The embodiments do not limit the invention and are illustrative, and all features to be described in the embodiments, and combinations thereof may not be the essential features of the invention.

Figure 3:
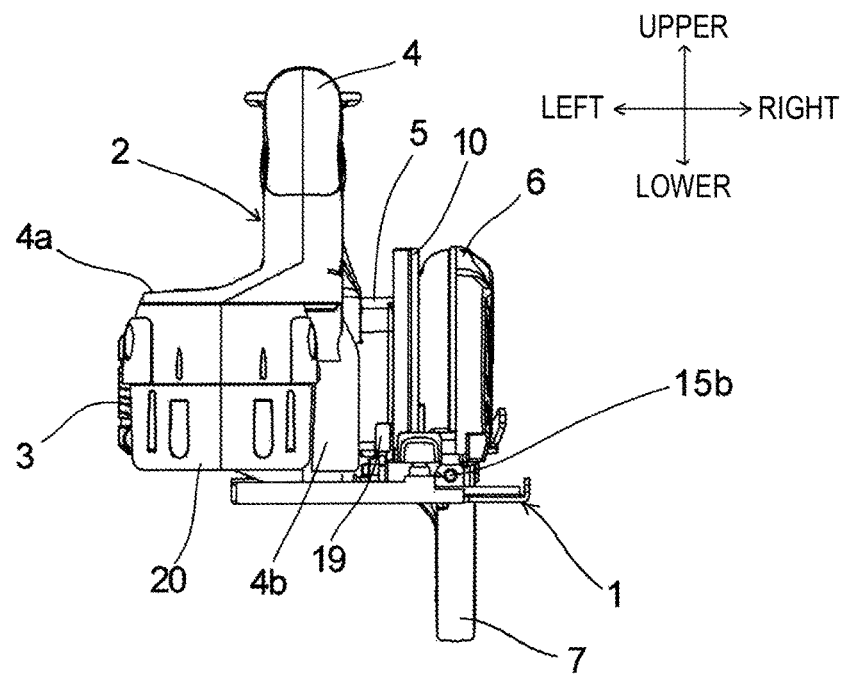
FIG. 3 is a rear view of the cordless circular saw.
Figure 4:
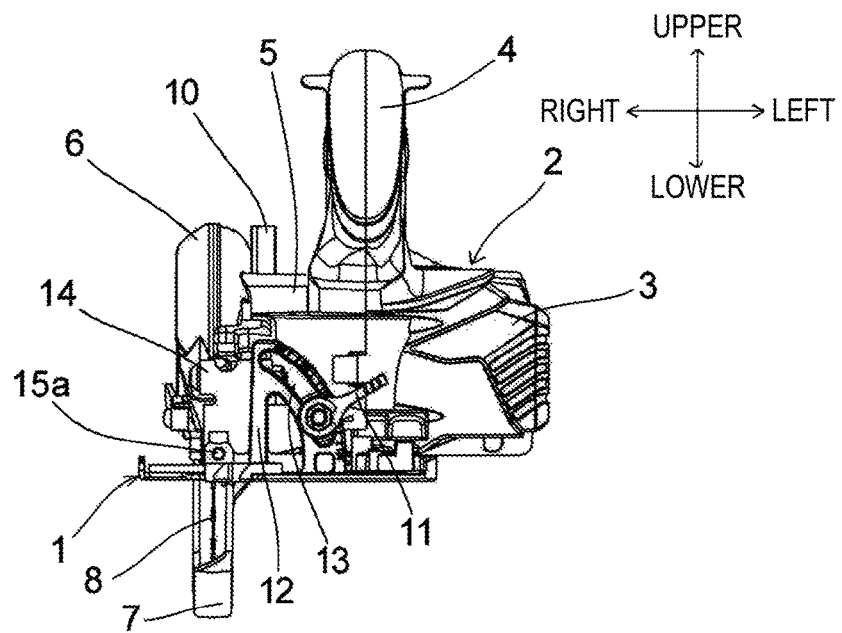
FIG. 4 is a front view of the cordless circular saw.
Figure 5:
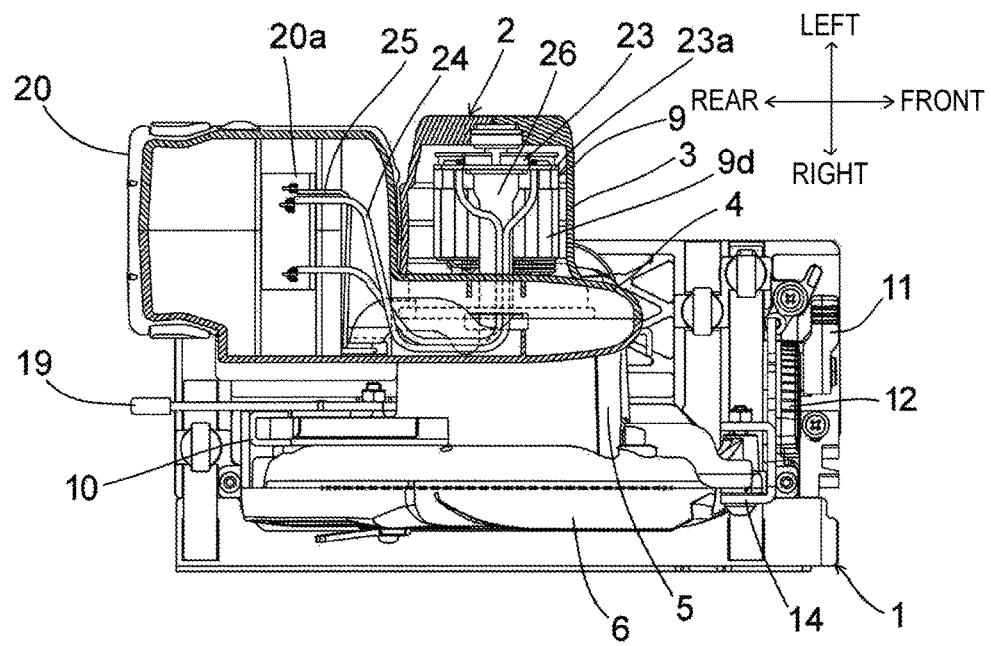
FIG. 5 is a first plan view of the cordless circular saw where a portion thereof is shown as a cross-section.
Figure 6:
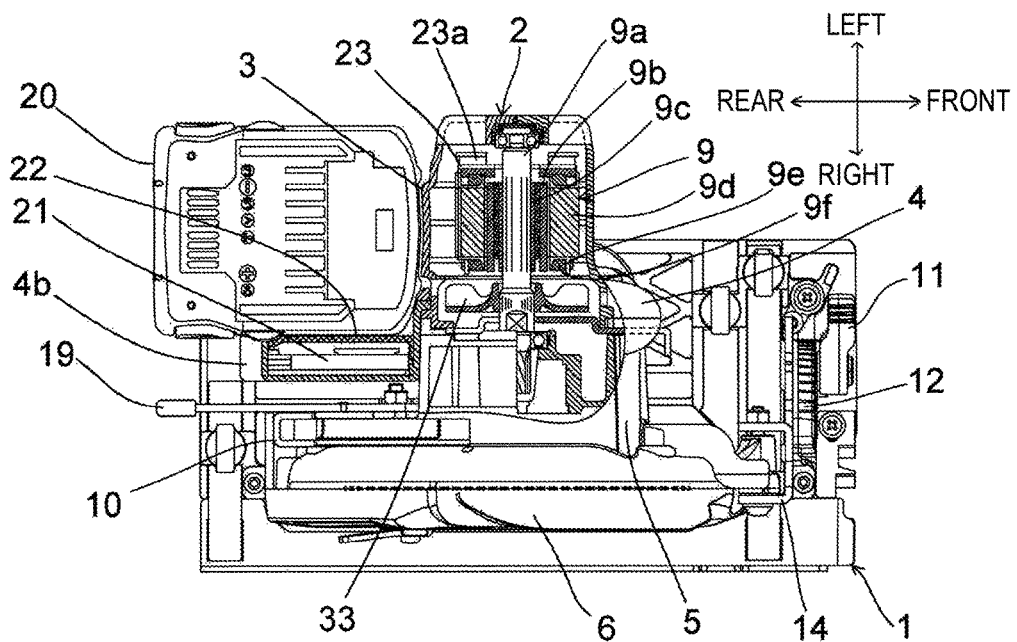
FIG. 6 is a second plan view of the cordless circular saw where another portion is shown as a cross-section.
Figure 7:
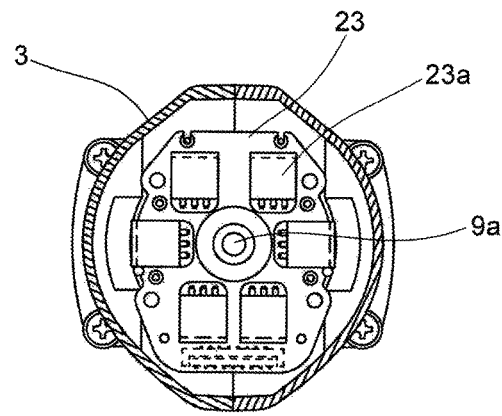
FIG. 7 is a cross-sectional view taken along a line A-A of FIG. 1.

FIGS. 1 to 4 are a plan view, a side view, a rear view, and a front view showing a cordless circular saw according to an embodiment of the present invention, respectively. FIG. 5 is a first plan view of the cordless circular saw where a portion thereof is shown as a cross-section. FIG. 6 is a second plan view of the cordless circular saw where another portion thereof is shown as a cross-section. FIG. 7 is a cross-sectional view taken along a line A-A of FIG. 1.

The cordless circular saw of the present embodiment includes a base 1 and a main body 2. The base 1 is a plate material made of a metal such as aluminum substantially in a rectangular shape. The longitudinal direction of the base 1 coincides with a cutting direction. The bottom of the base member 101 is a surface to slide on a workpiece. The main body 2 is joined with the base 1 at two positions in a front-rear direction such that the main body can rotate and tilt leftward or rightward with respect to the base 1. The main body 2 includes a motor housing 3, a handle portion 4, a gear cover 5, a saw cover 6, a protective cover 7, and a circular saw blade 8 (a rotary tool). The motor housing 3 is made of, for example, a resin, and accommodates a brushless motor 9 (FIGS. 5 and 6). The brushless motor 9 rotates the circular saw blade 8. The handle portion 4 is made of the same material as that of the motor housing 3, and extends in the front-rear direction on the motor housing 3. The handle portion 4 includes a main trigger switch 18 (a main switch) as an operation unit for allowing a user to perform switching between driving and stopping of the brushless motor 9. As shown in FIGS. 3 and 4, the handle portion 4 is configured by a left component provided integrally with the motor housing 3, and a right component interposed between the motor housing 3 and the gear cover 5, and the left component and the right component are combined to configure a battery pack attaching portion 4a (to be described below), and a control circuit board accommodating portion 4b (to be described below) is provided at the right component of the handle portion 4 positioned on a side of the circular saw blade 8. The boundary between the left component and the right component of the handle portion 4 is a line shown at the center of the handle portion 4 in FIG. 1, FIG. 3, FIG. 4, and so on.

At the lower portion of the rear end of the handle portion 4, the battery pack attaching portion 4a (a battery attaching portion) and the control circuit board accommodating portion 4b are integrally provided. A battery pack 20 (a rechargeable battery) is slid into the battery pack attaching portion 4a from the rear side, thereby being removably attached. On the upper surface of the battery pack attaching portion 4a on the lower side of the handle portion 4, a mode change switch 16 (for example, a tact switch) and an LED 29 to serve as a display unit for displaying a mode are provided. The user can select, for example, any one of a normal mode and an economy mode by the mode change switch 16. The mode change switch 16 and the LED 29 are provided on the same board, and when the economy mode is set by operating the mode change switch 16, the LED 29 is turned on. Since the mode change switch 16 is provided on the lower side of the handle portion 4, mode switching is prevented from being unexpectedly performed due to a cause such as a collision of the mode change switch 16 with something. The battery pack 20 supplies driving power to the brushless motor 9. As shown in FIG. 1, the left surface of the battery pack 20 attached to the battery pack attaching portion 4a, and the left surface of the motor housing 3 exist substantially on the same plane. That is, the distance of the left surface of the motor housing 3 from the circular saw blade 8, and the distance of the left surface of the battery pack 20 from the circular saw blade 8 are substantially the same. Therefore, it is possible to place the cordless circular saw with the left surface of the battery pack 20 and the left surface of the motor housing 3 downward, and to easily perform work for exchanging the circular saw blade 8. The control circuit board accommodating portion 4b is provided on the right side of the battery pack 20. In the control circuit board accommodating portion 4b, a control circuit board 21 is stored and held. The control circuit board 21 has a control unit (a controller) mounted thereon for controlling the operation of the brushless motor 9. The control circuit board 21 is substantially perpendicular to the rotation axis of the brushless motor 9 (the rotation axis of the circular saw blade 8). The control circuit board 21, more specifically, the left side of the control circuit board 21 is partitioned off from the battery pack 20 by a controller cover 22 made of, for example, a resin.

The gear cover 5 is provided on the right side of the handle portion 4. The gear cover 5 is made of, for example, a metal, and accommodates a mechanism for transmitting rotation between the brushless motor 9 and the circular saw blade 8. The rotation transmitting mechanism is configured by a known deceleration mechanism. The saw cover 6 is attached to the gear cover 5, and covers the upper half of the circular saw blade 8 in conjunction with the gear cover 5. The saw cover 6 may be formed of the same material as that of the gear cover 5, integrally with the gear cover 5. The front end portions of the gear cover 5 and the saw cover 6 are rotatably joined by a rotation supporting unit 14. The protective cover 7 is made of, for example, a resin, and is rotatably provided along the outer edges of the gear cover 5 and the saw cover 6 on the rear side of the gear cover 5. Between the gear cover 5 and the protective cover 7, a spring (not shown) is interposed. This spring biases the protective cover 7 against the gear cover 5, in a direction (a counter-clockwise direction in FIG. 2) for covering the lower half of the circular saw blade 8 in the circumferential direction of the gear cover 5 and the saw cover 6. Therefore, in a state where cutting work is not being performed, the protective cover 7 covers the lower half of the circular saw blade 8 (a portion protruding from the bottom of the base 1), except for a portion of the front side.

On the front side of the base 1, a bevel plate 12 is provided to stand. The bevel plate 12 stands in a short-length direction substantially perpendicular to a cutting direction. The bevel plate 12 has a long hole 13. The long hole 13 has an arc shape having a first tilt shaft portion 15a extending in the cutting direction, as the center, and perpendicular to the first tilt shaft portion 15a. The rotation supporting unit 14 is supported to be able to tilt on the first tilt shaft portion 15a to left or right with respect to the base 1. The tilt position of the rotation supporting unit 14 is adjusted in a state where a tilt-angle adjusting lever 11 is loose, and is fixed by fastening the tilt-angle adjusting lever 11. The rotation supporting unit 14 rotatably supports the front end portion of the saw cover 6 on an axis parallel to the rotation axis of the brushless motor 9 (the rotation axis of the circular saw blade 8). Adjusting and fixing of the rotational position of the saw cover 6 will be described below.

On the rear side of the base 1, a link 10 is provided along the left surface of the gear cover 5 so as to be rotatable around a tilt shaft portion 15b concentric with the first tilt shaft portion 15a. The link 10 is made of a metal such as aluminum. In a state where a cutting-depth adjusting lever 19 is loose, the link 10 and the gear cover 5 are slidable with respect to each other, and thus it is possible to adjust the rotational position of the saw cover 6 with respect to the base 1, that is, the cutting depth. Further, it is possible to fix the rotational position of the gear cover 5 by fastening the cutting-depth adjusting lever 19.

As shown in FIG. 6, the brushless motor 9 has a rotor core 9b around an output shaft 9a. The output shaft 9a is parallel to the rotation axis of the circular saw blade 8. The rotor core 9b rotates integrally with the output shaft 9a. A rotor magnet 9c is inserted into and supported in the rotor core 9b. A stator core 9d is provided to surround the outer circumferential surface of the rotor core 9b. On the stator core 9d, a stator coil 9f is provided with an insulator 9e interposed therebetween. On the left end side of the stator core 9d, a switching board 23 is fixed. The switching board 23 is substantially perpendicular to the output shaft 9a. As shown in FIG. 7, on the switching board 23, six switching devices 23a (such as FETs) are mounted such that their main body portions are laid down. The switching devices 23a switch a supply voltage from the battery pack 20. As shown in FIG. 5, a terminal portion 20a of the battery pack 20, and the switching board 23 are electrically connected to each other by a wiring line 24. A wiring line 25 electrically connects the terminal portion 20a of the battery pack 20 and the control circuit board 21 to each other. A wiring line 26 electrically connects the control circuit board 21 and the switching board 23 to each other. A control signal from the controller of the control circuit board 21 is applied to control terminals (gates) of the switching devices 23a mounted on the switching board 23, by the wiring line 26, whereby ON/OFF of the switching devices 23a is controlled. A cooling fan 33 is attached to the output shaft 9a of the brushless motor 9, and rotates with the output shaft 9a. The cooling fan 33 generates an air flow which cools the brushless motor 9 and the switching devices 23a.

Figure 8:
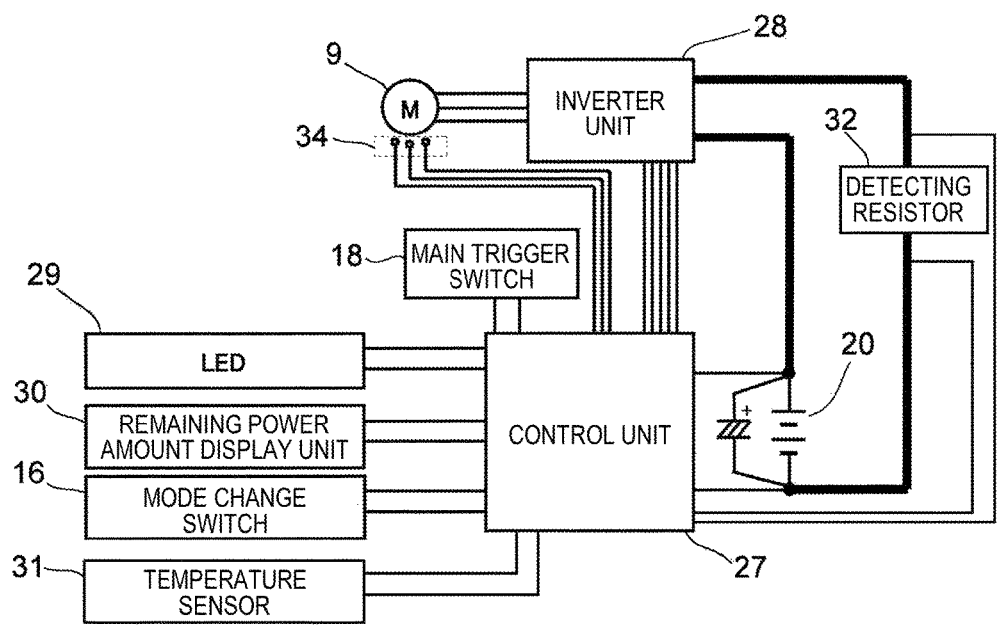
FIG. 8 is a view showing the functional blocks of the cordless circular saw shown in FIG. 1.

FIG. 8 is a view showing the functional blocks of the cordless circular saw according to the embodiment of the present invention. A control unit 27 is mounted on the control circuit board 21 shown in FIG. 6. An inverter unit 28 is a circuit obtained by connecting the switching devices 23a shown in FIGS. 6 and 7 in a bridge form. A remaining power amount display unit 30 displays the remaining power amount of the battery pack 20. A temperature sensor 31 includes a temperature detecting device such as a thermistor provided in the vicinity of the switching devices 23a of the inverter unit 28, and detects the temperature of the switching devices 23a. A detecting resistor 32 is provided on the path of a drive current for the brushless motor 9. The control unit 27 can detect the drive current (load current), i.e. a load, by the terminal voltage of the detecting resistor 32. Incidentally, the load is not limited to the current, and may be detected by a voltage, or a duty ratio, or the combination of them. A rotation sensor 34 is, for example, a magnetic sensor such as three Hall devices. The control unit 27 detects the rotation speed of the brushless motor 9 by an output signal of the rotation sensor 34. When the main trigger switch 18 is turned on, the control unit 27 applies a PWM signal to each switching device 23a of the inverter unit 28 according to a mode (for example, any one of the normal mode and the economy mode) set by the mode change switch 16, thereby controlling driving of the brushless motor 9. In the normal mode, the control unit 27 controls the duty ratio of the PWM signal to be applied to each switching device 23a such that the duty ratio becomes 100%, and in the economy mode, the control unit 27 controls the duty ratio such that the circular saw blade 8 rotates at a predetermined rotation speed (for example, 3,000 rpm). In a case of driving the brushless motor 9, in every mode, the control unit 27 performs soft start control for gradually increasing the duty ratio such that in the normal mode, the duty ratio becomes 100% when about 0.6 seconds elapses, and in the economy mode, in an no-load state, the circular saw blade 8 rotates at the predetermined rotation speed when about 0.4 seconds elapses.

Figure 9:
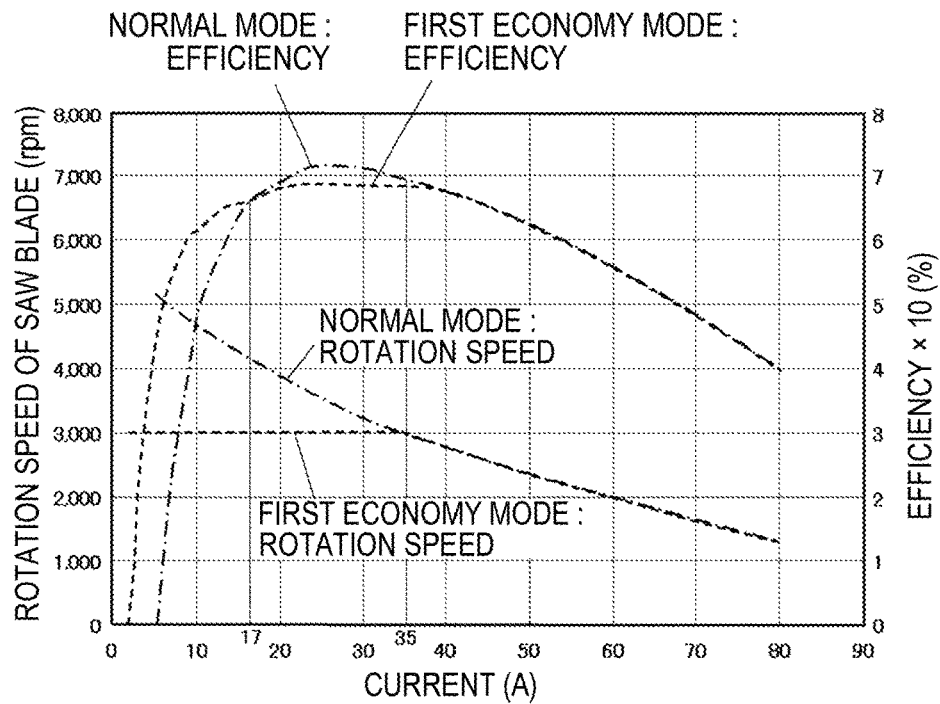
FIG. 9 is a characteristic diagram showing the rotating speed and efficiency of a circular saw blade 8 with respect to load current when the cordless circular saw of the embodiment is in a normal mode and in a first economy mode.

FIG. 9 is a characteristic diagram showing the rotating speed and efficiency of the circular saw blade 8 with respect to load current when the cordless circular saw of the embodiment is in the normal mode and in the first economy mode. In the normal mode (an example of a high-speed mode), the duty ratio is always at the maximum (for example, 100%), and as the load current increases from a no-load state, the rotation speed of the circular saw blade 8 decreases. A first economy mode (an example of a low-speed mode) is different from the normal mode in that when the load current is equal to or less than a predetermined value (about 35 A in the example of FIG. 9), control (constant-speed control) is performed on the rotation speed such that the rotation speed becomes constant (3,000 rpm in the example of FIG. 9), but is the same as the normal mode in control when the load current exceeds the predetermined value. That is, in the first economy mode, if the load increases, the duty ratio increases, and if the load exceeds the predetermined value, the duty ratio becomes the maximum (for example, 100%). Therefore, when a load exceeding the predetermined value is applied, even in the first economy mode, the same control as that in the normal mode is performed. Incidentally, there may be multiple economy modes different in the rotation speed during constant-speed control. For example, it may be possible to select an economy mode (an example of a low-speed mode) in which the rotation speed during constant-speed control is in a range from 2,500 rpm to 3,500 rpm, and an economy mode (an example of a high-speed mode) in which the rotation speed during constant-speed control is in a range from 4,500 rpm to 5,500 rpm.

As shown in FIG. 9, when the load current is equal to or less than a predetermined value (about 17 A in the example of FIG. 9), the efficiency (the ratio of output with respect to input power) of the first economy mode is higher than that of the normal mode. Meanwhile, when the load current exceeds the predetermined value, in a range up to a load current value (about 35 A in the example of FIG. 9) at which the duty ratio becomes the maximum (as same in the normal mode), the efficiency of the normal mode is higher than that of the first economy mode. That is, at a certain load current value, the efficiency of the normal mode and the efficiency of the first economy mode are reversed. Therefore, for efficient use of input power, there is room for improvement on the first economy mode.

Figure 10:
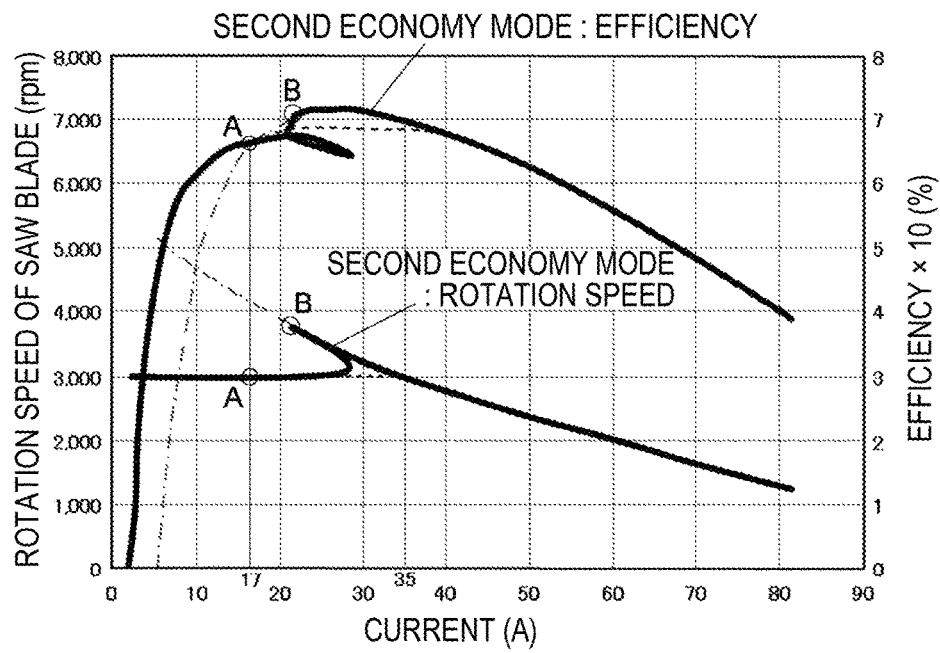
FIG. 10 is a characteristic diagram showing the rotating speed and efficiency of the circular saw blade 8 with respect to load current when the cordless circular saw of the embodiment is in a second economy mode.
Figure 11:
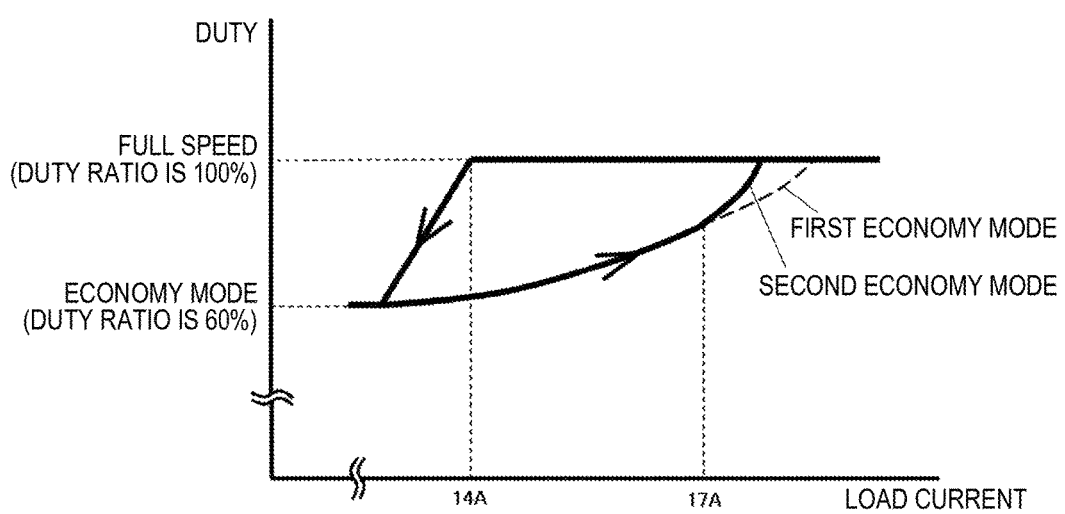
FIG. 11 is an explanatory view showing duty ratio control according to variation in load current when the cordless circular saw of the embodiment is in the second economy mode.

FIG. 10 is a characteristic diagram showing the rotating speed and efficiency of the circular saw blade 8 with respect to load current when the cordless circular saw of the embodiment is in a second economy mode. FIG. 10 shows the characteristics of the normal mode and the first economy mode shown in FIG. 9, together with the characteristic of a second economy mode (shown by a thick line). FIG. 11 is an explanatory view showing duty ratio control according to variation in load current when the cordless circular saw of the embodiment is in the second economy mode. In FIG. 11, change in duty ratio in the first economy mode is shown by a broken line.

As shown in FIG. 10, in the second economy mode (an example of a low-speed mode), when the load current is equal to or less than the predetermined value (for example, about 17 A) at which the efficiency of the normal mode and the efficiency of the first economy mode are reversed, the constant-speed control same as that in the first economy mode is performed; however, if the load current exceeds the predetermined value, control for increasing the rotation speed is performed. Specifically, in the second economy mode, if the load current exceeds 17 A, the duty ratio gradually increases to 100% regardless of (independent from) the rotation speed, and thereafter, the duty ratio is maintained at 100%. This control increases the rotation speed of the circular saw blade 8 from 3,000 rpm during constant-speed control to about 3,800 rpm (in FIG. 10, transition from an operation point "A" to an operation point "B" is performed). The operation point "B" is on the characteristic curve of the normal mode. After the load current exceeds 17 A and the duty ratio becomes 100%, the efficiency of the second economy mode becomes the same as that of the normal mode. Therefore, in the second economy mode, in a range from 17 A to 35 A, it is possible to more efficiently use input power as compared to the first economy mode. In the second economy mode, after the load current exceeds 17 A and the duty ratio becomes 100% (after transition to the operation point "B"), the same control as that in the normal mode is performed until the load current becomes less than 14 A. If the load current becomes less than 14 A, the duty ratio gradually decreases such that the rotation speed of the circular saw blade 8 decreases to 3,000 rpm, and then the same constant-speed control as that in the first economy mode is performed.

Figure 12:
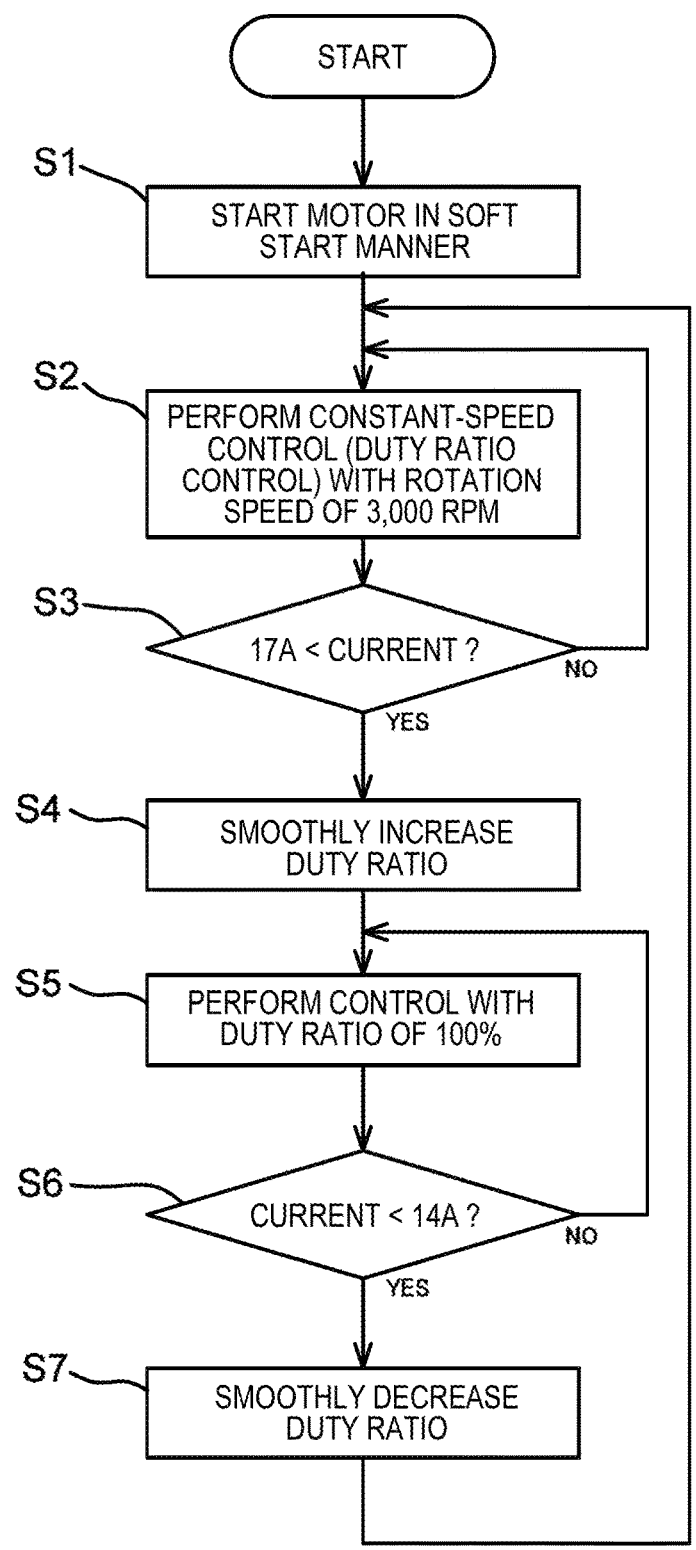
FIG. 12 is a flow chart showing a control flow when the cordless circular saw of the embodiment is in the second economy mode.
Figure 13:
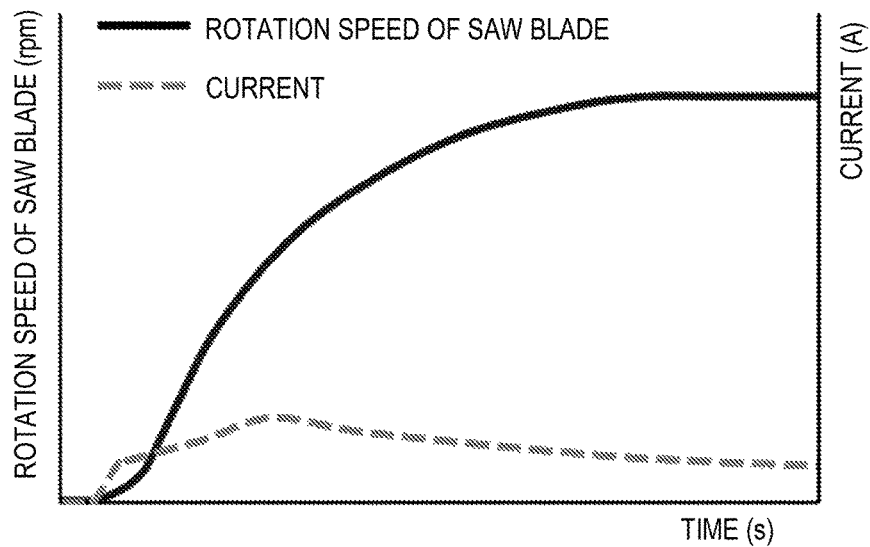
FIG. 13 is an explanatory view showing time change in the rotation speed of the circular saw blade 8 and time change in supply current for a brushless motor 9 during soft start of the brushless motor 9 of the embodiment.

FIG. 12 is a flow chart showing a control flow when the cordless circular saw of the embodiment is in the second economy mode. If the user turns on the main trigger switch 18, the control flow starts. If the main trigger switch 18 is turned on, in Step S1, the control unit 27 starts the brushless motor 9 in a soft start manner. Time change in the rotation speed of the circular saw blade 8 and time change in the supply current (load current) for the brushless motor 9 during soft start are as shown in FIG. 13, and this current supply causes the rotation speed of the circular saw blade 8 to smoothly increase. If the rotation speed of the circular saw blade 8 becomes 3,000 rpm, in Step S2, the control unit 27 performs constant-speed control at this rotation speed. Specifically, while monitoring the rotation speed of the brushless motor 9 by a signal from the rotation sensor 34, the control unit 27 controls the duty ratio of the PWM signal to be applied to the switching devices 23a such that the rotation speed of the circular saw blade 8 is constant at 3,000 rpm. The same constant-speed control as that in the first economy mode continues until the load current exceeds 17 A ("NO" in Step S3). If the load current exceeds 17 A during the constant-speed control being performed ("YES" in Step S3), in Step S4, the control unit 27 smoothly increases the duty ratio to 100%, regardless of (independent from) the rotation speed of the brushless motor 9. If the duty ratio becomes 100%, in Step S5, the control unit 27 drives the brushless motor 9 with the duty ratio of 100%. The same control with the duty ratio of 100% as that in the normal mode continues until the load current becomes less than 14 A ("NO" in Step S6). If the load current becomes less than 14 A ("YES" in Step S6), in Step S7, while monitoring the rotation speed of the brushless motor 9 by the signal from the rotation sensor 34, the control unit 27 smoothly decreases the duty ratio until the rotation speed of the circular saw blade 8 becomes 3,000 rpm. Then, the control flow returns to the constant-speed control of Step S2.

According to the above-described embodiment, it is possible to achieve the following effects.

(1) In the first economy mode, in a load range from 0 to the predetermined value, the duty ratio is suppressed and the constant-speed control is performed. Therefore, it is possible to reduce the rotation speed during no-load as compared to the normal mode. As a result, it is possible to reduce vibration and noise, and to prevent power consumption from unnecessarily increasing. Since power consumption is reduced, the work amount per one charging increases, and thus it is convenient. Meanwhile, when the load is equal to or larger than the predetermined value, the duty ratio becomes the maximum like in the normal mode. Therefore, work efficiency is improved.

(2) In the second economy mode, in a load range in which the efficiency of the normal mode is higher than the first economy mode, the constant-speed control is not performed and the same control as that in the normal mode is performed. Therefore, it is possible to more effectively use input power as compared to the first economy mode.

(3) In the second economy mode, when the duty ratio is increased from the constant-speed control, regardless of the rotation speed, and when the duty ratio is decreased from 100% for the purpose of the constant current control, the duty ratio is gradually changed (the rotation speed of the circular saw blade 8 is smoothly changed). Therefore, the cordless circular saw has low back action and is easy to use. Also, in every mode, during starting of the brushless motor 9, soft start control is performed. Therefore, even during start, the cordless circular saw has low back action and is easy to use.

(4) In the second economy mode, the load value (for example, 14 A) in the case of decreasing the duty ratio from 100% for the purpose of the constant-speed control is set to be smaller than the load value in the case of increasing the duty ratio regardless of the rotation speed from the constant-speed control. Therefore, it is possible to prevent control switching from being frequently performed, such that the cordless circular saw becomes stable.

Although the invention has been described by reference to the embodiment, it can be understood by those skilled in the art to which the invention pertains that a variety of modifications can be applied to the components and processes of the embodiment without departing from the scope of claims.

Figure 14:
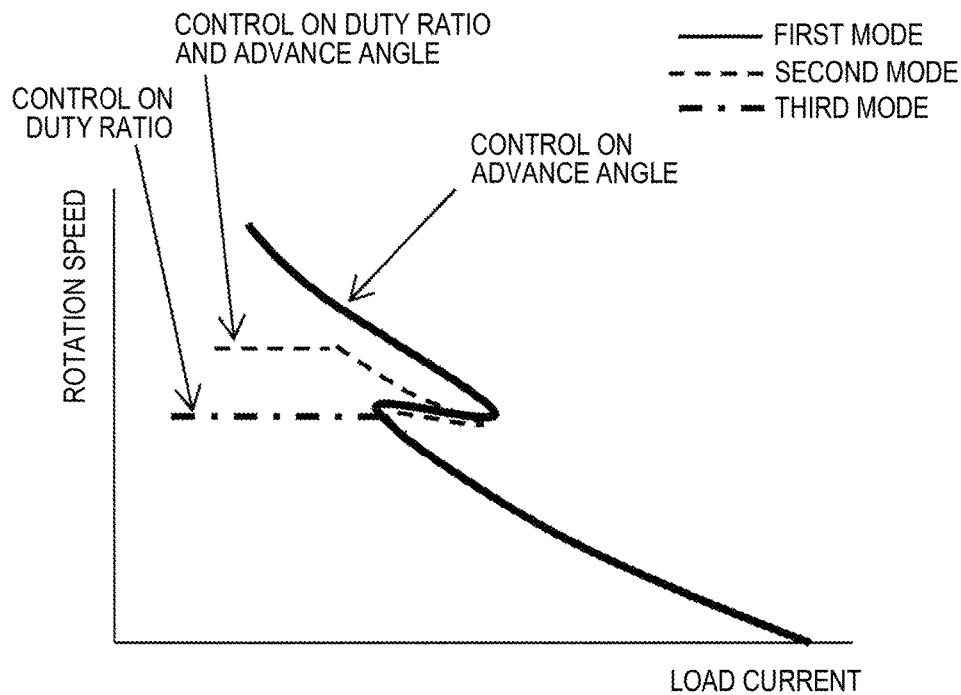
FIG. 14 is a characteristic diagram showing the relation between rotation speed and load current in each mode in an embodiment in which not only duty ratio control but also advance-angle control are performed.

FIG. 14 is a characteristic diagram showing the relation between rotation speed and load current in each mode in an embodiment in which not only duty ratio control but also advance-angle control are performed. In a first mode, in a load current range from 0 to a predetermined value, the brushless motor 9 is controlled, for example, with the duty ratio of 100% and an advance angle of 90 degrees, and if the load current exceeds the predetermined value, the brushless motor 9 is controlled, for example, with the duty ratio of 100% and an advance angle of 15 degrees. In the first mode, a load current value for changing the advance angle from 15 degrees to 90 degrees is set to be smaller than a load current value for changing the advance angle from 90 degrees to 15 degrees, whereby frequent switching is prevented. In the first mode shown in FIG. 14, during a low load, a large advance angle is taken. Therefore, it is possible to increase the rotation speed during no-load, and in a case of raising its profile with high-speed rotation during no-load, it is effective. In a second mode, in a low load range including no-load, constant-speed control based on duty ratio control with an advance angle of 45 degrees is performed, and if the load current exceeds a load current value at which the duty ratio becomes 100% by the constant-speed control, the brushless motor 9 is controlled, for example, with the duty ratio of 100% and the advance angle of 45 degrees until the load current becomes a predetermined value, and if the load current exceeds the predetermined value, the brushless motor 9 is controlled, for example, with the duty ratio of 100% and the advance angle of 15 degrees. In the second mode, the load current value for changing the advance angle from 15 degrees to 45 degrees is set to be smaller than the load current value for changing the advance angle from the 45 degrees to 15 degrees, whereby frequent switching is prevented. In a third mode, the advance angle is fixed at 15 degrees, and in the low load range including no-load, constant-speed control based on duty ratio control is performed, and if the load current exceeds a value at which the duty ratio becomes 100% by the constant-speed control, the brushless motor 9 is controlled with the duty ratio of 100%. Since the advance-angle control is added as described above, it is possible to set various modes.

Figure 15:
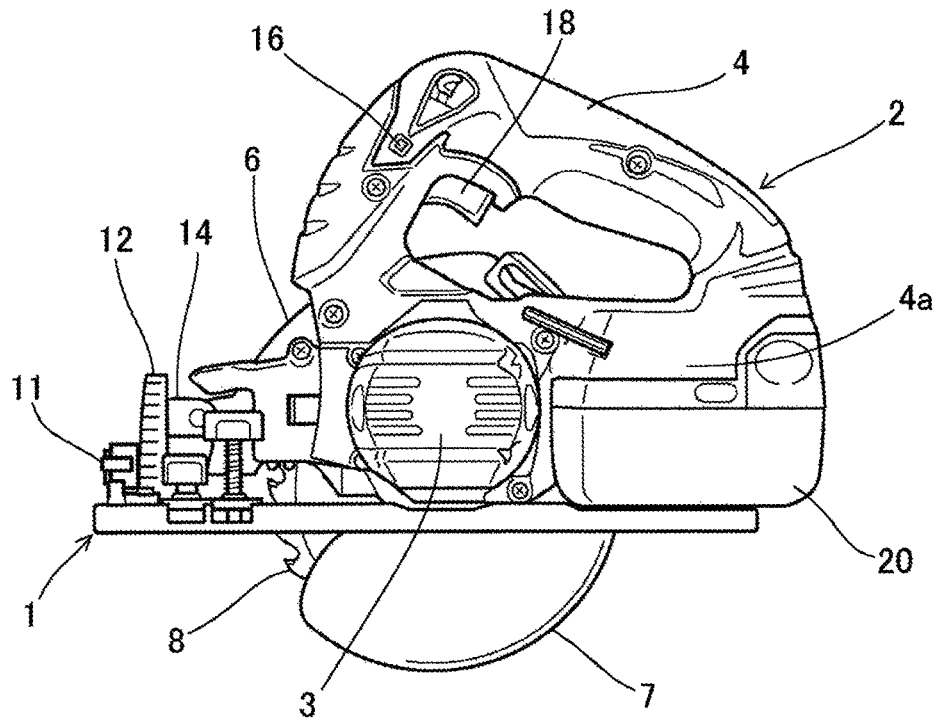
FIG. 15 is a side view showing a cordless circular saw according to another embodiment of the present invention, wherein a mode change switch 16 is provided in the vicinity of a main trigger switch 18 of a handle portion 4.

FIG. 15 is a side view showing a cordless circular saw according to an embodiment having a mode change switch 16 provided in the vicinity of the main trigger switch 18 of the handle portion 4. According to the configuration of FIG. 15, since it is possible to operate both of the main trigger switch 18 and the mode change switch 16 with a hand grasping the handle portion 4, the cordless circular saw is easy to use. Specifically, in a case of holding the handle portion 4 with a right hand, it is possible to operate the mode change switch 16 with the thumb of the right hand, and in a case of holding the handle portion 4 with a left hand, it is possible to operate the mode change switch 16 with the index finger or middle finger of the left hand. Therefore, it is possible to easily perform mode switching in the middle of work, and operability is excellent.

Figure 16:
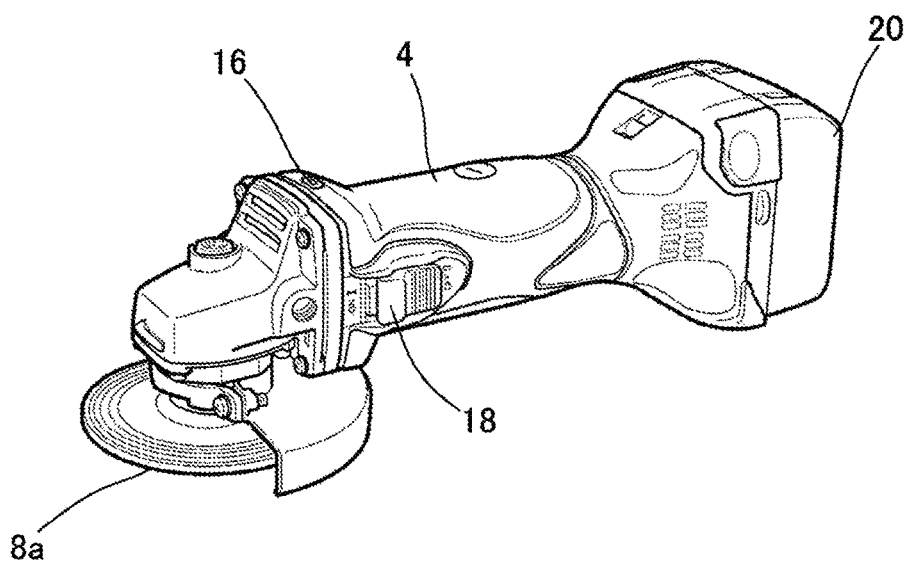
FIG. 16 is a perspective view showing a grinder according to another embodiment of the present invention.
Figure 17:
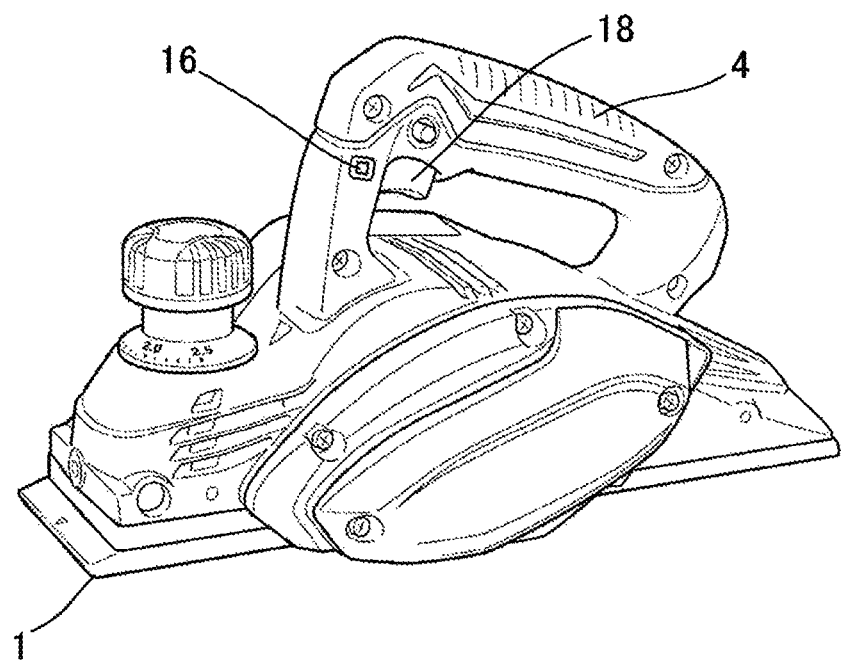
FIG. 17 is a perspective view showing an electric planer according to another embodiment of the present invention.

The electric power tool is not limited to the cordless circular saw as explained above embodiment, and may be any other electric power tool such as a grinder or an electric planer. FIG. 16 is a perspective view showing a grinder according to another embodiment. When a main trigger switch 18 is turned on, whereby a grind stone 8a is rotated by a motor, the grinder performs polishing or grinding. FIG. 17 is a perspective view showing an electric planer according to another embodiment. When a main trigger switch 18 is turned on, whereby a cutter block is rotated by a motor, the electric planer planes the surface of a workpiece. Not only in the case of the grinder shown in FIG. 16 but also in the case of the electric planer shown in FIG. 17, a functional block diagram is the same as FIG. 8, and a control flow chart is the same as FIG. 10, and in a case where a predetermined condition is satisfied, even if the main trigger switch 18 is on, it is possible to perform switching between operation modes by pushing the mode change switch 16. Also, since the mode change switch 16 is provided in the vicinity of the main trigger switch 18 of the handle portion 4, it is possible to operate both of the main trigger switch 18 and the mode change switch 16 with a hand holding the handle portion 4. Also, the present invention may be preferable for an electric power tools such as a grinder or an electric planer which performs rotation control on a brushless motor 9 regardless of the operation amount (pulling amount) of the main trigger switch 18.

In the above-described embodiment, it is possible to select the normal mode in which the duty ratio is always 100%, and an economy mode (the first or second economy mode) in which constant-speed control is performed such that the duty ratio becomes 100% in a high load state. According to this configuration, as described above, it is not necessarily to perform switching from the economy mode to the normal mode according to the load state. Therefore, there are effects that it is unnecessary to frequently perform mode switching during work, and operability is excellent. However, it may be possible to select the normal mode in which the duty ratio is always 100%, and for example, an economy mode (third mode) in which the duty ratio is always 80%. Also, the duty ratio in the normal mode (and the maximum value of the duty ratio in each mode) may be, for example, 95% less than 100%. Also, only the second economy mode described in the embodiment may exist as an operation mode. The brushless motor 9 may be driven in a sensorless manner in which any rotation sensor (position sensor) is not used. In this case, the rotation speed may be detected without using a rotation sensor. In the embodiment, as a driving source, the brushless motor is used. However, a motor with a brush may be used as a driving source. Parameters such as the duty ratio, the rotation speed, and the load current values are not limited to the specific values exemplified in the embodiment, and can be arbitrarily set.

This application claims priority from Japanese Patent Application No. 2013-169596 filed on Aug. 19, 2013, the entire contents of which are incorporated herein by reference.

The invention claimed is:

1. An electric power tool comprising:
   a brushless motor;
   a controller configured to control power supply to the brushless motor, the controller including a detector configured to detect a load on the brushless motor;
   a rotary tool configured to be rotated by the brushless motor;
   a rotation speed detecting unit configured to detect a rotation speed of the brushless motor; and
   a main switch configured for switching between driving and stopping of the brushless motor
   wherein the controller is configured to perform the rotation control of the brushless motor in any one of the multiple modes including at least a high-speed mode and a low-speed mode,
   wherein in the low-speed mode, the controller is configured to control the brushless motor to rotate at a constant rotation speed by duty ratio control,
   wherein in the high-speed mode, the controller is configured to control the brushless motor to rotate at a constant duty ratio,
   wherein in the low-speed mode, when the load detected is equal to or larger than a first predetermined value, the controller is configured to perform switching of the low-speed mode to the high-speed mode and increasing the rotation speed of the motor.

2. The electric power tool according to claim 1, further comprising:
   a battery pack which is removably attached and is configured to supply electric power to the brushless motor and the controller.

3. The electric power tool according to claim 1,
   wherein detection of the load equal to or larger than the first predetermined value is performed based on predetermined one or combination of a current, a voltage, and a duty ratio.

4. The electric power tool according to claim 1,
   wherein the predetermined duty ratio control includes control for gradually increasing a duty ratio to a predetermined duty ratio and then driving the brushless motor with the predetermined duty ratio.

5. The electric power tool according to claim 1,
   wherein when a load equal to or smaller than a second predetermined value which is smaller than the first predetermined value for switching to the predetermined duty ratio control is detected in a state where the predetermined duty ratio control is performed, the controller is configured to gradually decrease the duty ratio and then control the brushless motor to rotate at a predetermined first rotation speed.

6. The electric power tool according to claim 1,
   wherein the rotary tool is connected to an output shaft of the brushless motor through a deceleration mechanism, and
   wherein in the low-speed mode, the controller is configured to be able to control the brushless motor such that a rotation speed of the rotary tool becomes constant in a range from 2,500 rpm to 3,500 rpm.

7. The electric power tool according to claim 1,
   wherein the controller is configured to perform soft start control for gradually supplying a current at starting of the brushless motor.

8. The electric power tool according to claim 1 further comprising a mode switching unit configured to transmit, to the controller, a mode switching signal for switching between multiple modes of rotation control of the brushless motor.

9. The electric power tool according to claim 1,
   wherein the detector is a resistor for detecting a current of the brushless motor.

10. An electric power tool comprising:
    a brushless motor;
    a controller configured to control power supply to the brushless motor, the controller including a detector configured to detect a load on the brushless motor;
    a rotary tool configured to be rotated by the brushless motor;
    a rotation speed detecting unit configured to detect a rotation speed of the brushless motor; and
    a main switch configured for switching between driving and stopping of the brushless motor,
    wherein the controller is configured to perform rotation control of the brushless motor in any one of multiple modes including at least a constant-speed control mode and a predetermined duty ratio control mode,
    wherein in the constant-speed control mode, the controller is configured to control the brushless motor to rotate at a constant rotation speed by a duty ratio smaller than 100%,
    wherein in the predetermined duty ratio control mode, the controller is configured to control the brushless motor to rotate by the constant duty ratio,
    wherein in the constant-speed control mode, when the load detected is equal to or larger than a first predetermined value, the controller is configured to perform switching from the constant-speed control mode to the predetermined duty ratio control mode, and
    wherein at least in a part of load range in the predetermined duty ratio control mode, the controller is configured to be able to drive the brushless motor at a speed exceeding the constant rotation speed.

11. The electric power tool according to claim 10,
    wherein the load at which the constant-speed control is switched to the predetermined duty ratio control is set to such a threshold value that if the load exceeds the threshold value, an efficiency of the predetermined duty ratio control becomes higher than an efficiency of the constant-speed control, or is set to a value in the vicinity of the threshold value.

12. The electric power tool according to claim 10,
    wherein when a load equal to or smaller than a second predetermined value is detected in a state where the predetermined duty ratio control is performed, the controller is configured to gradually decrease the duty ratio such that the rotation speed of the brushless motor becomes a predetermined rotation speed, and then perform the constant-speed control on the brushless motor at the predetermined rotation speed.

13. The electric power tool according to claim 12, wherein the second predetermined value at which the duty ratio is decreased from the predetermined duty ratio control to the constant-speed control is smaller than the first predetermined value at which the constant-speed control is changed to the predetermined duty ratio control.

14. The electric power tool according to claim 10, wherein the detector is a resistor for detecting a current of the brushless motor.

* * * * *